(12) United States Patent
Kimura

(10) Patent No.: US 8,098,562 B2
(45) Date of Patent: Jan. 17, 2012

(54) OBJECTIVE LENS COMPRISING A DIFFRACTION STRUCTURE FOR DISTRIBUTING LIGHT IN TO LIGHT OF DIFFERENT DIFFRACTION ORDERS, OPTICAL PICKUP DEVICE, AND OPTICAL INFORMATION RECORDING OR REPRODUCTION APPARATUS HAVING SAME

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1416 days.

(21) Appl. No.: 11/108,639

(22) Filed: Apr. 19, 2005

(65) Prior Publication Data
US 2005/0237898 A1 Oct. 27, 2005

(30) Foreign Application Priority Data
Apr. 23, 2004 (JP) .................................. 2004-128629

(51) Int. Cl.
*G11B 7/00* (2006.01)
(52) U.S. Cl. ........... 369/112.1; 369/112.03; 369/112.04; 369/112.05; 369/112.06; 369/112.07; 369/44.37; 369/44.38
(58) Field of Classification Search .............. 369/112.07, 369/44.37, 112.1, 112.05, 112.03, 112.08; 359/15, 573, 721, 742, 637
See application file for complete search history.

(56) References Cited

U.S. PATENT DOCUMENTS

| | | | | |
|---|---|---|---|---|
| 5,644,413 A * | 7/1997 | Komma et al. | ............. | 369/44.23 |
| 5,838,496 A * | 11/1998 | Maruyama et al. | ............. | 359/565 |
| 6,330,118 B1 * | 12/2001 | Daschner et al. | ............. | 359/721 |
| 6,807,019 B2 * | 10/2004 | Takeuchi et al. | ............. | 359/742 |
| 6,898,168 B2 * | 5/2005 | Kimura et al. | ............. | 369/112.01 |
| 7,126,902 B2 * | 10/2006 | Sakamoto et al. | ........ | 369/112.08 |
| 7,245,407 B2 * | 7/2007 | Komma | .................... | 369/112.1 |
| 7,636,290 B2 * | 12/2009 | Mimori et al. | ............. | 369/112.08 |
| 2004/0160885 A1 * | 8/2004 | Kimura | .................... | 369/112.09 |
| 2004/0213134 A1 * | 10/2004 | Takada et al. | ............. | 369/112.08 |

* cited by examiner

*Primary Examiner* — Joseph Haley
(74) *Attorney, Agent, or Firm* — Finnegan, Henderson, Farabow, Garrett & Dunner, LLP

(57) ABSTRACT

An objective lens includes a diffraction structure for distributing much of a quantity of an incident light beam into two diffracted lights having different diffraction orders from each other, wherein recording or reproduction of information on an optical disk is performed by converging the diffracted light having a longer focal length of the two diffracted lights onto an information recording surface through a protective layer of the optical disk, and a distance from the objective lens to a surface of the protective layer along an optical axis is longer than a distance between focuses of the two diffracted lights along the optical axis when the diffracted light having the longer focal length is converged onto the information recording surface of the optical disk.

9 Claims, 8 Drawing Sheets

FIG.1A

OPTICAL AXIS

FIG.1B

OPTICAL AXIS

FIG.2A

OPTICAL AXIS

FIG.2B

OPTICAL AXIS

FIG.3A

OPTICAL AXIS

FIG.3B

OPTICAL AXIS

FIG.4A

OPTICAL AXIS

FIG.4B

OPTICAL AXIS

OBJECTIVE LENS COMPRISING A DIFFRACTION STRUCTURE FOR DISTRIBUTING LIGHT IN TO LIGHT OF DIFFERENT DIFFRACTION ORDERS, OPTICAL PICKUP DEVICE, AND OPTICAL INFORMATION RECORDING OR REPRODUCTION APPARATUS HAVING SAME

BACKGROUND OF THE INVENTION

1. Field of the Invention

The present invention relates to an objective lens, an optical pickup device and an optical information recording or reproduction apparatus.

2. Description of Related Art

Hitherto an objective lens for performing recording of information on an optical disk and reproduction of information recorded on an optical disk by distributing much of the quantity of incident light beam into two diffracted lights having a different diffraction order from each other and converging a diffracted light having either of the diffraction orders onto an information recording surface of the optical disk, has been known (for example, see JP-Tokukaihei-9-179020A). There has been a problem that detection of a focus other than a focus used for recording or reproduction easily occurs in such an objective lens having a plurality of focuses when a focus pull-in operation is performed.

A bifocal objective lens disclosed in the above document distributes much of the quantity of incident light beam to two focuses by a diffraction structure formed on the lens surface to compatibly perform recording or reproduction on two types of optical disks having a same light source wavelength and different protective layer thicknesses from each other.

In general, a focus having a longer focal length is detected earlier in a plurality of focuses because an optical pickup device performs a focus pull-in operation by bringing an objective lens close to an optical disk gradually. Accordingly, when lens design is performed as the technique disclosed in the above document in which the distance along the optical axis between two focuses is not sufficiently long, there is a possibility of detecting the focus having the shorter focal length in focusing the focus having the longer focal length on the information recording surface of an optical disk.

SUMMARY OF THE INVENTION

An object of the present invention results from consideration of the above problem, and is to provide a multifocal objective lens, optical pickup device and optical information recording or reproduction apparatus capable of improving the accuracy of detection of a focusing position.

To solve the above problem, in accordance with the first aspect of the invention, an objective lens comprises a diffraction structure for distributing much of a quantity of an incident light beam into two diffracted lights having different diffraction orders from each other, wherein recording or reproduction of information on an optical disk is performed by converging the diffracted light having a longer focal length of the two diffracted lights onto an information recording surface through a protective layer of the optical disk, and a distance from the objective lens to a surface of the protective layer along an optical axis is longer than a distance between focuses of the two diffracted lights along the optical axis when the diffracted light having the longer focal length is converged onto the information recording surface of the optical disk.

According to this objective lens, there is a design for using the longer one of two focuses for recording or reproduction, such that a focus detected earlier in a focus pull-in operation is the focus used for recording or reproduction and it is possible to improve the accuracy of detection of the focusing position. Even if the focus having the longer focal length cannot be detected, there is no possibility of detecting the focus having the shorter focal length because of a design having the distance along the optical axis between the two focuses longer than the working distance.

Here, a working distance indicates a distance along the optical axis between the surface of a protective layer of an optical disk and an objective lens when the focus having the longer focal length is focused on an information recording surface of the optical disk. Also, "distributing much of the quantity of incident light beam into two diffracted lights having a different diffraction order from each other" indicates that the sum of diffraction efficiencies of two diffracted lights that have the two highest diffraction efficiencies in diffracted lights with various diffraction orders generated by the diffraction structure is not less than 60%.

In the specification, an "objective lens" indicates an optical system including at least a converging element that is arranged at a position opposite an optical disk and has a function of converging a light beam emitted from a light source onto the information recording surface of the optical disk in an optical pickup device. The objective lens may consist of only the converging element, and in such a case, a diffraction structure is formed on the optical surface of the converging element.

Further, in case that there is an optical element that is integrated with the above converging element and performs tracking and focusing by an actuator, an optical system comprising the optical element and converging element is the objective lens. In case that the objective lens comprising a plurality of optical elements like this, it is preferable to form a diffraction structure on the optical surface of an optical element other than the converging element in order to reduce the influence of eclipse of the light beam owing to a step of the diffraction structure although the diffraction structure may be formed on the optical surface of the converging element.

In the objective lens of the present invention, it is preferable that the objective lens is used for an optical pickup device for performing recording and/or reproduction of information on a plurality of types of optical disks having different thicknesses of protective layer from one another by using light beams of a first wavelength λ1, a second wavelength λ2 and a third wavelength λ3, which are different from one another, the incident light beam, much of whose quantity is distributed into the two diffracted lights having the different diffraction orders from each other, is a light beam having a longest wavelength of the first wavelength λ1, the second wavelength λ2 and the third wavelength λ3, and a diffracted light having a longer focal length of two diffracted light of the light beam having the longest wavelength is converged onto an information recording surface of an optical disk having a thickest protective layer.

Here, a plurality of standards of a high density optical disk using a blue-violet laser diode light source are proposed. Also in order to make use of software resources of digital versatile disks (hereinbelow, abbreviated to DVD) and compact disks (hereinbelow, abbreviated to CD) which are widely distributed to the market at present, an objective lens capable of performing recording or reproduction of a plurality of standards of optical disk having different using wavelengths compatibly, is desired. An objective lens on the surface of which a diffraction structure is formed is known as an objective lens having compatibility for an earlier CD and DVD. In case of achieving an objective lens having a compatibility for a high density optical disk and a CD by using the diffraction structure, it is necessary to split laser beam used for a CD into two focus by the diffraction structure and use one of the focuses for recording or reproduction of the CD because the wavelength of laser beam used for a CD is approximately twice as long as the wavelength of laser beam used for a high density optical disk. Therefore, in such a compatible objective lens, the above preferable design makes it possible to improve the accuracy of detection of a focusing position on the CD side.

In the specification, optical disk using a blue-violet laser diode light source, such as Blu-ray disks (hereinbelow, abbreviated to BD) using an objective lens having an NA of 0.85 and having a protective layer thickness of 0.1 mm or HD DVDs (hereinbelow, abbreviated to HD) using an objective lens having an NA of 0.65 to 0.67 and having a protective layer thickness of 0.6 mm, are generically named "high density optical disks". In addition to the above-described BD and HD, the high density optical disks includes magneto-optical disks, optical disks having a protective layer with a thickness of several to several dozen nm on an information recording surface and optical disks having a protective layer or protective membrane with a thickness of 0 (zero).

In the specification, DVD is a generic name for optical disks of DVD series, such as DVD-ROM, DVD-Video, DVD-Audio, DVD-RAM, DVD-R, DVD-RW, DVD+R, DVD+RW and the like, and CD is a generic name for optical disks of CD series, such as CD-ROM, CD-Audio, CD-Video, CD-R, CD-RW and the like.

In the objective lens of the present invention, it is preferable that the first wavelength $\lambda 1$, the second wavelength $\lambda 2$ and the third wavelength $\lambda 3$ are $\lambda 1$, $\lambda 2$ and $\lambda 3$ in ascending order of wavelength, and the diffraction structure does not diffract the light beam of the first wavelength $\lambda 1$ and the light beam of the second wavelength $\lambda 2$, but diffracts the light beam of the third wavelength $\lambda 3$.

According to this, it is possible to correct the aberration of the third wavelength $\lambda 3$ independently by providing the objective lens with the diffraction structure for diffracting only a light beam of the third wavelength $\lambda 3$ selectively, and accordingly, it is possible to provide a compatible objective lens having superior design performance.

Figure 1A:
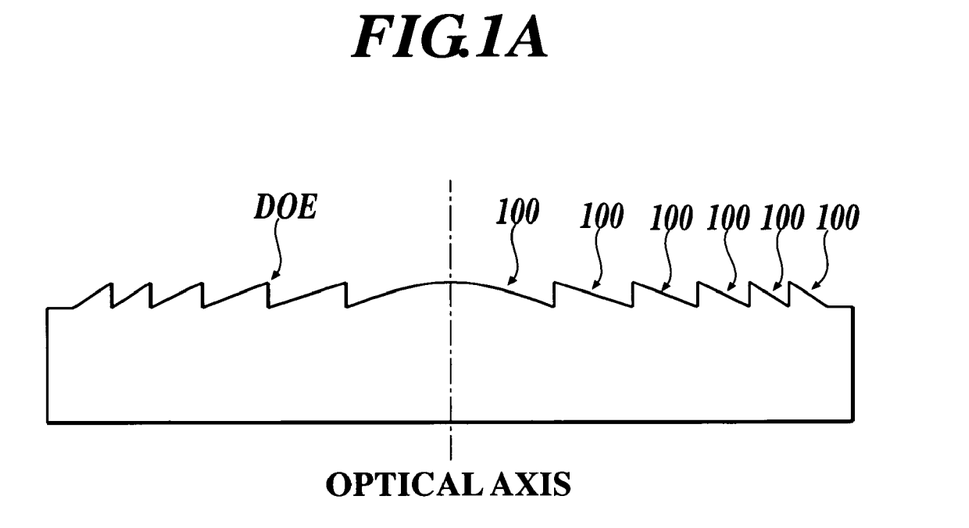
FIGS. 1A and 1B are side views showing an example of a diffraction structure DOE.
Figure 1B:
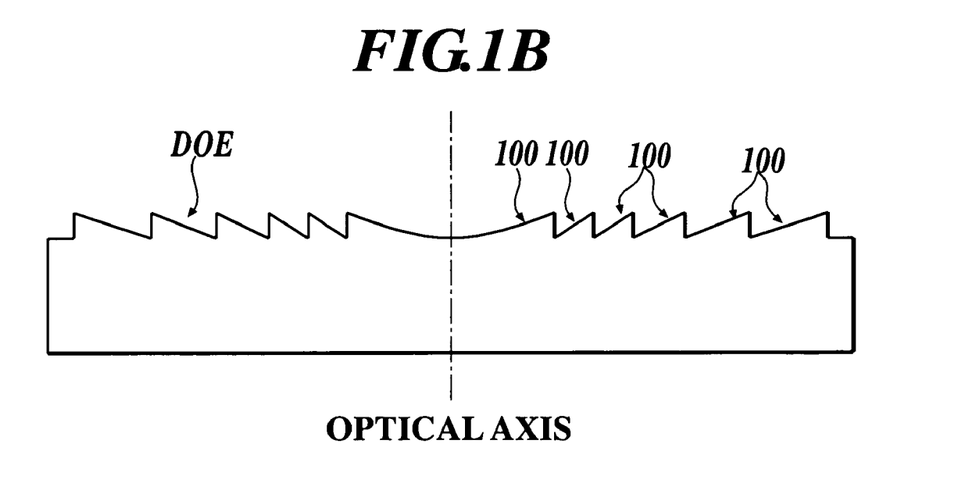
Figure 2A:
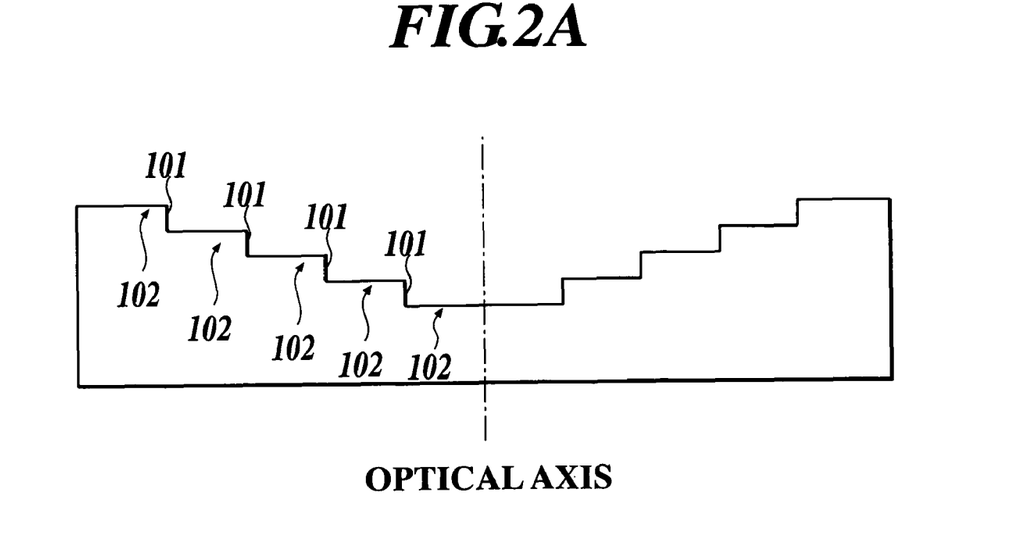
FIGS. 2A and 2B are side views showing an example of a diffraction structure DOE.
Figure 2B:
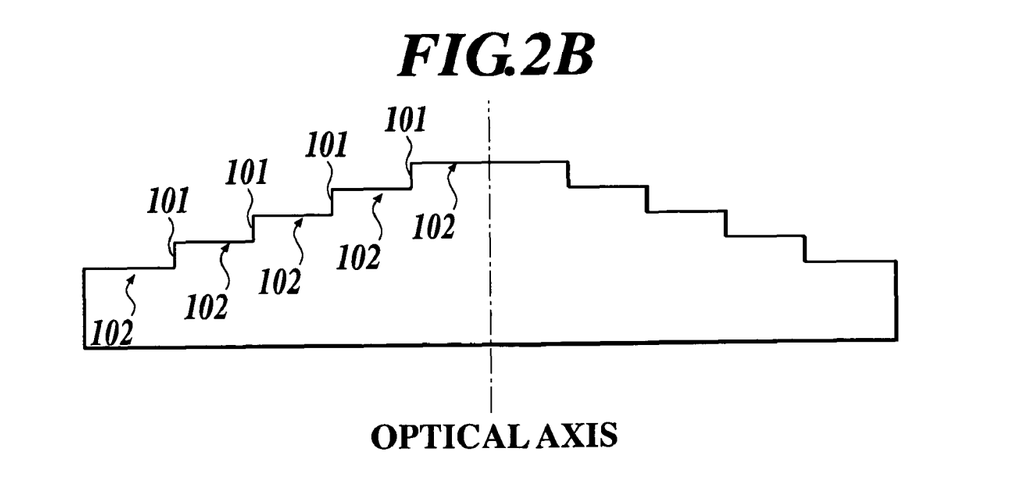
Figure 3A:
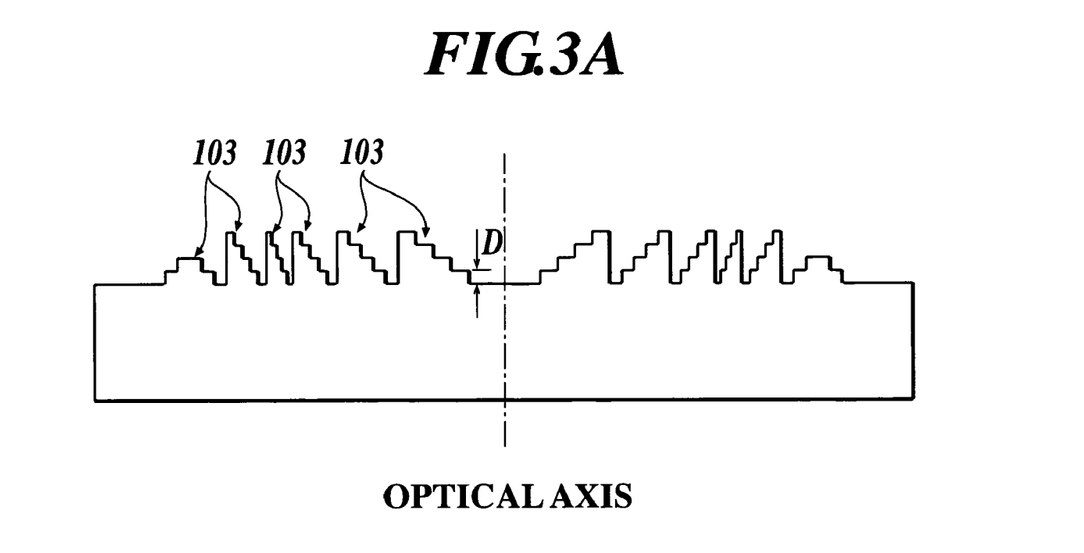
FIGS. 3A and 3B are side views showing an example of a diffraction structure HOE.
Figure 3B:
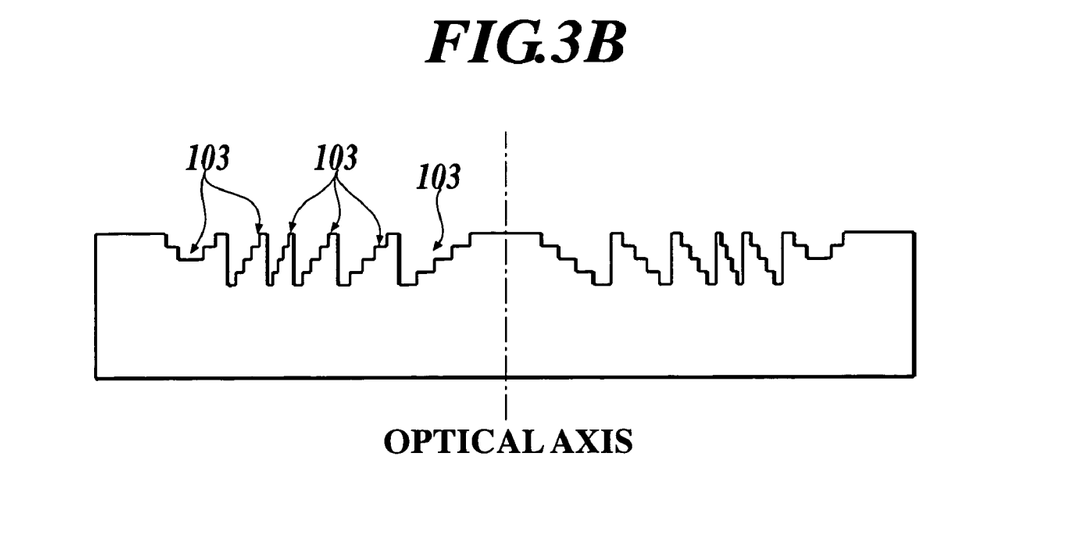
Figure 4A:
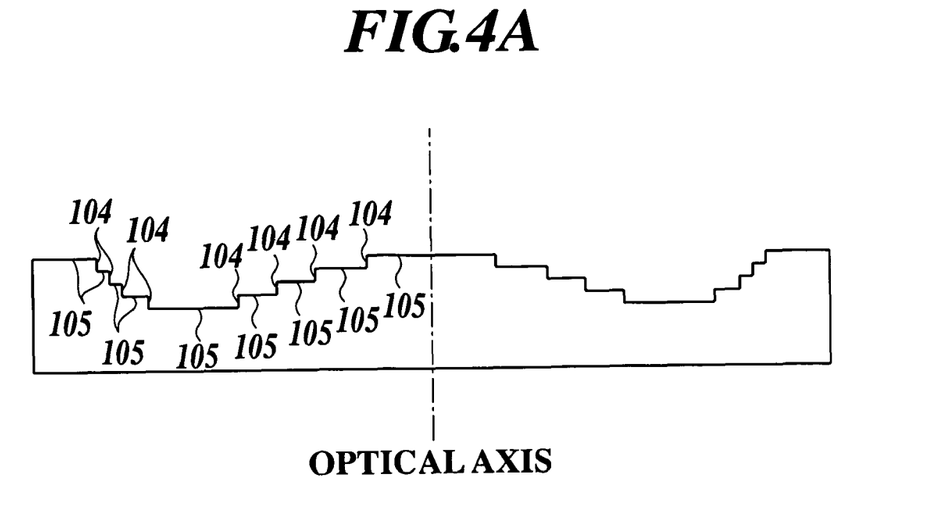
FIGS. 4A and 4B are side views showing an example of a diffraction structure DOE.
Figure 4B:
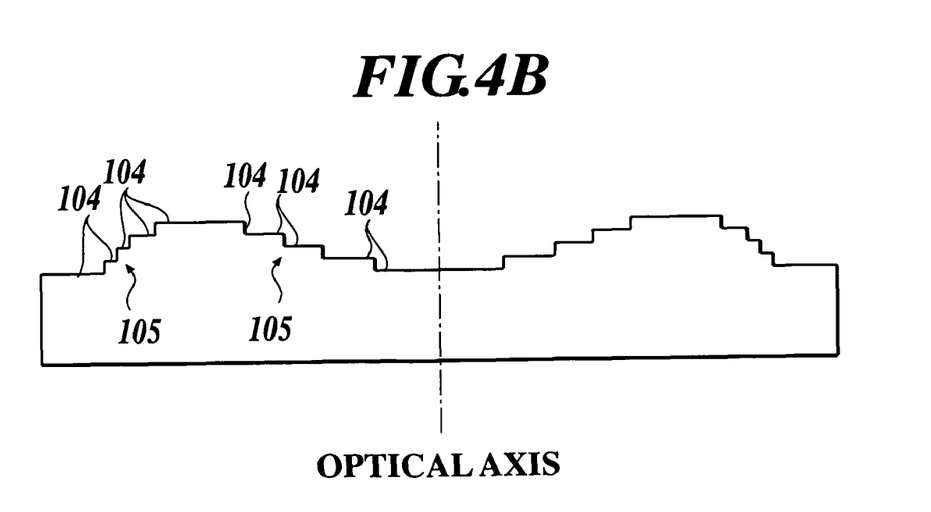

The diffraction structure formed on the objective lens of the present invention employs a diffraction structure comprising a plurality of ring surfaces 100 in which a sectional form including an optical axis is a sawtooth form as schematically shown in FIGS. 1A and 1B, a diffraction structure comprising a plurality of ring surfaces 102 in which the directions of steps 101 are the same in the effective diameter and the sectional form including the optical axis is a step form as schematically shown in FIGS. 2A and 2B, a diffraction structure comprising a plurality of ring surfaces 103, each having a step structure therein, or comprising a plurality of ring surfaces 103 having a step structure as schematically shown in FIGS. 3A and 3B, and a diffraction structure comprising a plurality of ring surfaces 105 in which the directions of the steps 104 interchange in the middle of the effective diameter and the sectional form including the optical axis is a step form as schematically shown in FIGS. 4A and 4B. More particularly, it is preferable to select the multi-level type diffraction structure shown schematically in FIGS. 3A and 3B, and it is preferable to distribute much of the quantity of the light beam of the third wavelength $\lambda 3$ into two diffracted light of the m-th order diffracted light and the −m-th order diffracted light.

Although FIGS. 1A and 1B to 4A and 4B schematically show cases in which a diffraction structure is formed on a plane surface, a diffraction structure may be formed on a spherical or aspherical surface. Although the diffraction structures in FIGS. 3A and 3B show cases in which each ring surface is divided into five, the number of division of each ring surface is not limited thereto.

In the specification, symbol "DOE" denotes a diffraction structure comprising a plurality of ring surfaces as shown in FIGS. 1A, 1B, 2A, 2B, 4A and 4B, and symbol "HOE" denotes a multi-level type diffraction structure comprising a plurality of ring surfaces in which step structures are formed as shown in FIGS. 3A and 3B.

In the above multi-level type diffraction structure, in order not to diffract a light beam of the first wavelength $\lambda 1$ and a light beam of the second wavelength $\lambda 2$ but to selectively diffract a light beam of the third wavelength $\lambda 3$, it is preferable that an optical path difference generated by the height of one step of the step structure is made an integral multiple of the first wavelength $\lambda 1$ and the second wavelength $\lambda 2$ and a half-integral multiple of the third wavelength $\lambda 3$. Thereby, a light beam of the first wavelength $\lambda 1$ and a light beam of the second wavelength $\lambda 2$ transmit without being affected by the diffraction structure since the light beams are substantially given no optical path differences by the height of one step. On the other hand, much of the quantity of a light beam of the third wavelength $\lambda 3$ is distributed into the m-th order diffracted light and the −m-th order diffracted light because the light beam is given an optical path difference of half-wavelength by the height of one step. Here, a compatible objective lens having compatibility for high density optical disk and CD can be achieved by determining the diffracting power such that one of the diffracted lights is converged onto an information recording surface of an optical disk having the thickest protective layer with little aberration. That "an optical path difference generated by the height of one step of the step structure is a half-integral multiple of the third wavelength $\lambda 3$" means meeting $d \cdot (N\lambda 3 - 1)/\lambda 3 = p - 0.5$ ("p" is a natural number) where "d" denotes the height of one step of the step structure, "$N\lambda 3$" denotes the refractive index of the diffraction structure for the third wavelength $\lambda 3$ and "$\lambda 3$" denotes the third wavelength $\lambda 3$.

It is preferable that a paraxial diffracting power is negative. According to this, it is possible to ensure a sufficient working distance for CDs having a thick protective layer. Here, a diffracting power $\phi_d$ in the paraxial position is defined by $\phi_d = -2 \cdot dor \cdot B_2$, using a 2nd-order diffraction surface coefficient $B_2$ of the after-described optical path difference function and a diffraction order dor of a diffracted light used for recording or reproduction.

Also, in the objective lens of the present invention, it is preferable that a spherical aberration of a wavefront formed by converging the diffracted light having the longer focal length through the protective layer is not more than 0.07$\lambda$rms, and a spherical aberration of a wavefront formed by converging the diffracted light having a shorter focal length through the protective layer is not less than 0.5$\lambda$rms, where $\lambda$ is a wavelength of the incident light beam.

According to this, a spherical aberration caused by the differences of wavelengths and thicknesses between high density optical disk and CD can be corrected preferably when a spherical aberration in converging the diffracted light having the longer focal length used for recording or reproduction through the protective layer is not more than 0.07 $\lambda$rms, and a spherical aberration in converging the diffracted light having a shorter focal length through the protective layer is not less than 0.5 $\lambda$rms.

In accordance with the second aspect of the present invention, an optical pickup device for performing recording and/ or reproduction of information on an optical disk by using a light beam emitted from a light source comprises the above-described objective lens, wherein the optical pickup device performs a focus pull-in operation by bring the objective lens close to the optical disk.

According to this, it is possible to obtain an optical pickup device having the same effect as above.

In accordance with the third aspect of the present invention, an optical pickup device for performing recording and/or reproduction of information on a plurality of types of optical disks having different thicknesses of protective layer from one another by using light beams of a first wavelength λ1, a second wavelength λ2 and a third wavelength λ3 which are different from one another, comprises: a first light source for emitting the light beam of the first wavelength λ1; a second light source for emitting the light beam of the second wavelength λ2; a third light source for emitting the light beam of the third wavelength λ3; and an objective lens comprising a diffraction structure for distributing much of a quantity of an incident light beam having a longest wavelength of the first wavelength λ1, the second wavelength λ2 and the third wavelength λ3 into two diffracted lights having the different diffraction orders from each other, wherein the objective lens performs recording or reproduction of information on an optical disk having a thickest protective layer of the plurality of types of optical disk by converging the diffracted light having a longer focal length of the two diffracted lights onto an information recording surface through the protective layer of the optical disk, and a distance from the objective lens to a surface of the protective layer along an optical axis is longer than a distance between focuses of the two diffracted lights along the optical axis when the diffracted light having the longer focal length is converged onto the information recording surface of the optical disk.

According to this, it is possible to obtain an optical pickup device having the same effect as above.

In the optical pickup device of the present invention, it is preferable that the light beams of a first wavelength λ1, a second wavelength λ2 and a third wavelength λ3 are incident to the objective lens as a parallel light beam.

In accordance with the fourth aspect of the present invention, there is an optical information recording or reproduction apparatus in which the above-described optical pickup device is mounted.

According to this, it is possible to obtain an optical pickup device having the same effect as above.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENTS OF THE INVENTION

Hereinbelow, an embodiment of the present invention is described with reference to the drawings.

Figure 5:
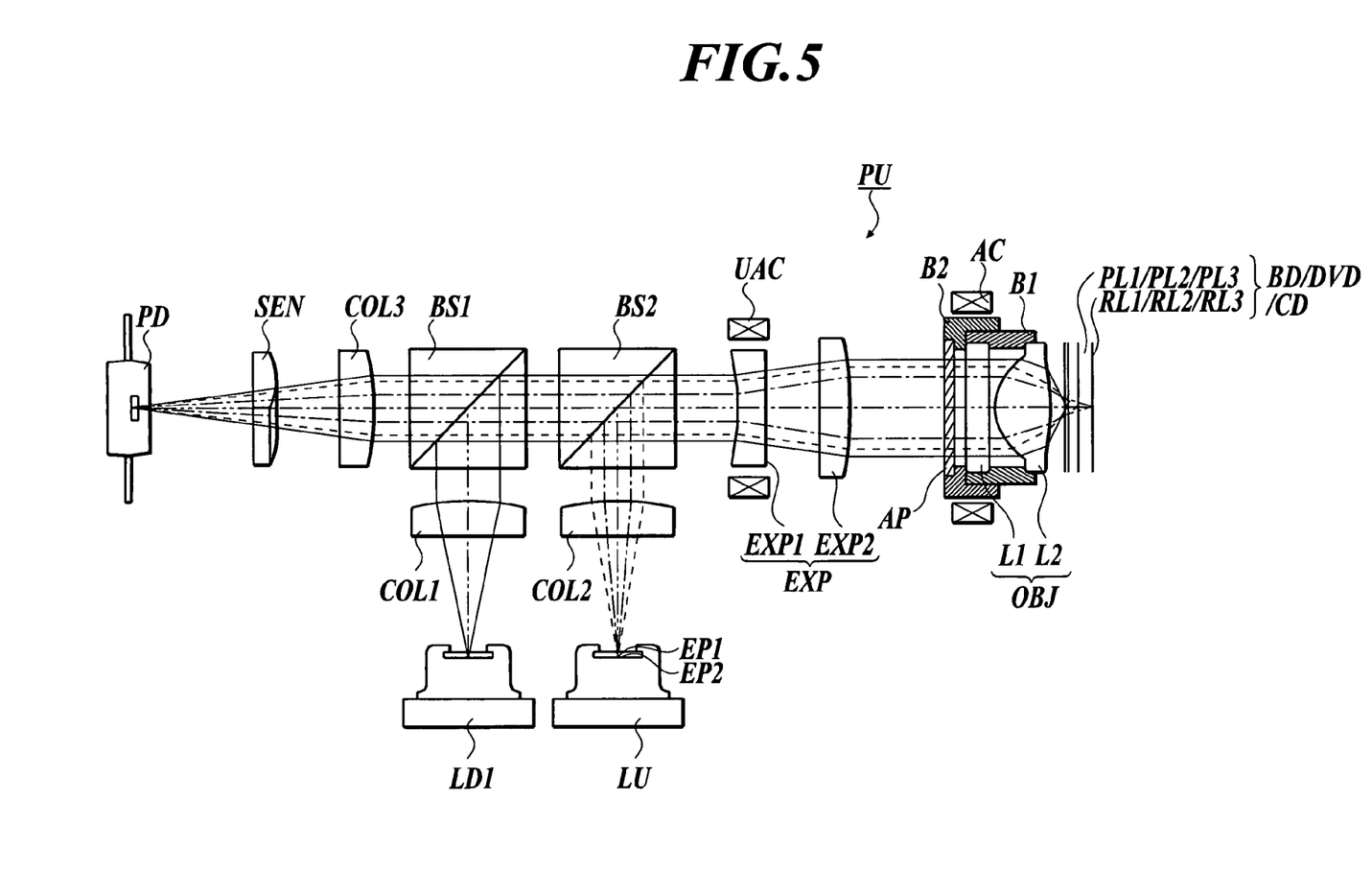
FIG. 5 is a substantial-part plane view showing a configuration of an optical pickup device.

FIG. 5 is a view schematically showing the configuration of an optical pickup device PU capable of performing information recording or reproducing adequately to any of BD, DVD and CD. The optical specifications of the BD are: the first wavelength λ1 thereof is 408 nm, the thickness t1 of the protective layer PL1 thereof is 0.0875 mm, and the numerical aperture NA1 thereof is 0.85. The optical specifications of the DVD are: the second wavelength λ2 thereof is 655 nm, the thickness t2 of the protective layer PL2 thereof is 0.6 mm, and the numerical aperture NA2 thereof is 0.65. The optical specifications of the CD are: the third wavelength λ3 thereof is 785 nm, the thickness t3 of the protective layer PL3 thereof is 1.2 mm, and the numerical aperture NA3 thereof is 0.45. However, the combinations of the wavelengths, the thicknesses of the protective layers and the numerical apertures are not restricted to those ones.

The optical pickup device PU comprises: a blue-violet laser diode LD1 (first light source) which emits light at the time of performing the recording or reproducing of information to a BD to emit a laser beam (first light beam) of 407 nm; a DVD/CD laser light source unit LU comprising a first emission point EP1 (second light source) which emits light at the time of performing the recording or reproducing of information to a DVD to emit a laser beam (second light beam) of 658 nm, and a second emission point EP2 (third light source) which emits light at the time of performing the recording or reproducing of information to a CD to emit a laser beam (third light beam) of 785 nm, which are formed on one chip; a BD/DVD/CD photo detector PD; an objective lens OBJ comprising an aberration correcting element L1, and a converging element L2 in which both of the surfaces having a function of converging laser beams transmitted through the aberration correcting element L1 on information recording surfaces RL1, RL2 and RL3 are formed as aspheric surfaces; an aperture limiting element AP; a two-axis actuator AC; a uniaxial actuator UAC; an expander lens EXP comprising a first lens EXP1 having a negative refractive power in the paraxial position and a second lens EXP2 a positive refractive power in the paraxial position; a first polarization beam splitter BS1; a second polarization beam splitter $BS_2$, a first collimate lens $COL_1$; a second collimate lens $COL_2$; a third collimate lens COL3; a sensor lens SEN for dividing reflected light beam from the information recording surface RL1, RL2 and RL3.

Besides the above blue-violet laser diode LD1, a blue-violet SHG laser may be used as the light source for BD.

While the DVD/CD laser light source unit LU comprising the second and third light sources is used in the above-described optical pickup device PU, a light source unit comprising any two light sources may be used and also a light source unit comprising all of the three light sources may be used.

In the case where the recording or reproducing of information is performed to the BD in the optical pickup device PU, as the light ray paths are drawn by solid lines in FIG. 5, first, the blue-violet laser diode LD1 is excited to emit light. A diverging light beam emitted from the blue-violet laser diode LD1 is converted into a parallel light beam by the first collimate lens COL1, and subsequently, the light beam is reflected by the first polarization beam splitter BS1 and passes through the second polarization beam splitter BS2. The light beam is then transmitted through the first lens EXP1 and the second lens EXP2, so that the size of the light beam is expanded. After the light beam size are regulated by a not shown stop, the beam light is transmitted through the aperture limiting element AP and then the light becomes a spot formed on the information recording surface RL1 by the objective OBJ through the protective layer PL1 of the BD. The objective OBJ performs focusing and tracking by a two-axis actuator AC disposed about the objective lens OBJ.

A reflected light beam modulated by an information pit on the information recording surface RL1 is again transmitted through the objective OBJ, the aperture limiting element AP, the second lens EXP2, the first lens EXP1, the second polarization beam splitter $BS_2$ and the first polarization beam splitter BS1. Subsequently, the reflected light beam becomes a converging light beam in passing the third collimate lens COL3. Then the light beam is divided by the sensor lens SEN to converge on the light-receiving surface of the photo detector PD. Thus, the information recorded on the BD can be read using an output signal of the photo detector PD.

In the case where the recording or reproducing of information is performed to the DVD in the optical pickup device PU, the first emission point EP1 is excited to emit light. As the light ray paths are drawn by dotted lines in FIG. 5, a diverging light beam emitted from the first emission point EP1 is converted into a parallel light beam by the second collimate lens COL2, and subsequently, the light beam is reflected by the second polarization beam splitter BS2. The light beam is then transmitted through the first lens EXP1 and the second lens EXP2, so that the size of the light beam is expanded. Subsequently, the beam light is transmitted through the aperture limiting element AP and then the light becomes a spot formed on the information recording surface RL2 by the objective OBJ through the protective layer PL2 of the DVD. The objective OBJ performs focusing and tracking by a two-axis actuator AC disposed about the objective lens OBJ.

A reflected light beam modulated by an information pit on the information recording surface RL2 is again transmitted through the objective OBJ, the aperture limiting element AP, the second lens EXP2, the first lens EXP1, the second polarization beam splitter $BS_2$ and the first polarization beam splitter BS1. Subsequently, the reflected light beam becomes a converging light beam in passing the third collimate lens COL3. Then the light beam is divided by the sensor lens SEN to converge on the light-receiving surface of the photo detector PD. Thus, the information recorded on the DVD can be read using an output signal of the photo detector PD.

In the case where the recording or reproducing of information is performed to the CD in the optical pickup device PU, the second emission point EP2 is excited to emit light. As the light ray paths are drawn by dash-dot lines in FIG. 5, a diverging light beam emitted from the second emission point EP2 is converted into a parallel light beam by the second collimate lens COL2, and subsequently, the light beam is reflected by the second polarization beam splitter BS2. The light beam is then transmitted through the first lens EXP1 and the second lens EXP2, so that the size of the light beam is expanded. Subsequently, the beam light is transmitted through the aperture limiting element AP and then the light becomes a spot formed on the information recording surface RL3 by the objective OBJ through the protective layer PL3 of the CD. The objective OBJ performs focusing and tracking by a two-axis actuator AC disposed about the objective lens OBJ.

A reflected light beam modulated by an information pit on the information recording surface RL3 is again transmitted through the objective OBJ, the aperture limiting element AP, the second lens EXP2, the first lens EXP1, the second polarization beam splitter $BS_2$ and the first polarization beam splitter BS1. Subsequently, the reflected light beam becomes a converging light beam in passing the third collimate lens COL3. Then the light beam is divided by the sensor lens SEN to converge on the light-receiving surface of the photo detector PD. Thus, the information recorded on the CD can be read using an output signal of the photo detector PD.

Figure 6:
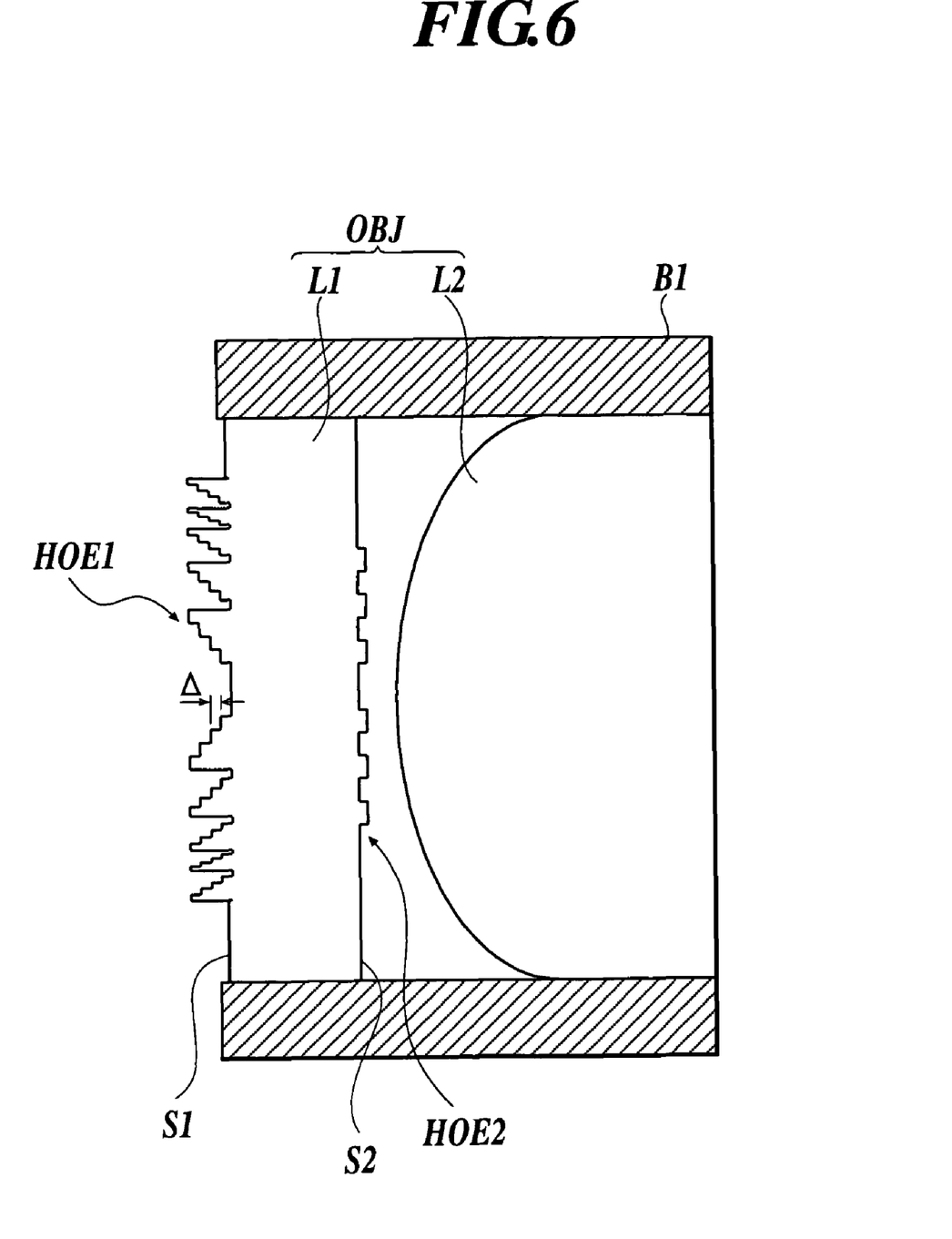
FIG. 6 is a plane view showing a configuration of an objective lens.

Next, the configuration of the objective lens OBJ will be described with reference to FIG. 6. The aberration correcting element L1 and converging element L2 are both plastic lenses. The aberration correcting element L1 and the converging element L2 are integrated through a combination member B1 and further, the objective lens OBJ and the aperture limiting element AP are integrated through a combination member B2.

A first diffraction structure HOE1 is formed on the optical function surface S1 on the light source side of the aberration correcting element L1. A second diffraction structure HOE2 (a multi-level type diffraction structure of the present invention) is formed on the optical function surface S2 on the optical disk side of the aberration correcting element L1.

The first diffraction structure HOE1 comprises a plurality of ring surfaces and each ring surface is divined into five stepwise. A step $\Delta$ of a step structure in each ring surface is set at the height meeting $\Delta=2\cdot\lambda_{BD}/(N_{BD}-1)$, where $N_{BD}$ is a refractive index of the aberration correcting element L1 at a wavelength of $\lambda_{BD}$.

Because an optical path difference added to the first light beam by the step structure is $2\times\lambda_{BD}$, the first light beam is transmitted as is, without being affected by the first diffraction structure HOE1.

Because an optical path difference added to the third light beam by the step structure is $1\times\lambda_{CD}$, the third light beam is also transmitted as is, without being affected by the first diffraction structure HOE1. Whereas, an optical path difference added to the second light beam by the step structure is $0.2\times\lambda_{DVD}$, so that one ring surface divided into five adds just an optical path difference of $1\times\lambda_{DVD}$ to generate a 1st order diffracted light. In this way, selective diffraction of only the second light beam corrects the spherical aberration owing to the difference between the protective layer thickness of a BD and the protective layer thickness of a DVD. The 0th order diffracted light (i.e. transmitted light) of the first light beam has a diffraction efficiency of 100%, the 1st order diffracted light of the second light beam has a diffraction efficiency of 87% and the 0th order diffracted light (i.e. transmitted light) of the third light beam has a diffraction efficiency of 100%, which are generated at the first diffraction structure HOE1. Thus, high diffraction efficiencies are obtained for all light beams.

A wavelength selection filter having wavelength selectivity on transmittance is formed on the optical surface of the aperture limiting element AP. The wavelength selection filter has wavelength selectivity on transmittance so as to transmit all wavelengths of λ1 to λ3 in the area within NA3, and cut off only a wavelength of λ3 in the area beyond NA3. The filter has a configuration in which aperture limitation for CDs is carried out by the wavelength selectivity.

The first diffraction structure HOE1 is formed only within the numerical aperture NA2 of DVD. Therefore there is a configuration in which a light beam passing the area beyond NA2 becomes a flare component on the information recording surface RL2 of the DVD and the aperture limitation for a DVD is automatically carried out.

The second diffraction structure HOE2 also comprises a plurality of ring surfaces and each ring surface is divined into two stepwise. A step $\Delta$ of a step structure in each ring surface is set at the height meeting $\Delta=5\cdot\lambda_{BD}/(N_{BD}-1)$, where $N_{BD}$ is a refractive index of the aberration correcting element L1 at a wavelength of λ1.

Because an optical path difference added to the first light beam by the step structure is $5\times\lambda_{BD}$, the first light beam is transmitted as is, without being affected by the second diffraction structure HOE2. Because an optical path difference added to the second light beam by the step structure is $3\times\lambda_{DVD}$, the second light beam is also transmitted as is, without being affected by the second diffraction structure HOE2. Whereas, an optical path difference added to the second light beam by the step structure is $0.5\times\lambda_{CD}$, SO that an optical path difference shifts by just a half-wavelength in one ring surface divided into two. Accordingly, much of the quantity of the third light beam incident to the second diffraction structure HOE2 is distributed to the 1st order diffracted light and the −1st order diffracted light. The second diffraction structure HOE2 is designed so that the 1st order diffracted light of them is converged on the information recording surface of a CD. The spherical aberration owing to difference between the protective layer thickness of a BD and the protective layer thickness of a CD is corrected by using this diffraction effect.

The 0th order diffracted light (i.e. transmitted light) of the first light beam has a diffraction efficiency of 100%, the 0th order diffracted light (i.e. transmitted light) of the second light beam has a diffraction efficiency of 100% and the 1st order diffracted light of the third light beam has a diffraction efficiency of 40.5%, which are generated at the first diffraction structure HOE1. Thus, high diffraction efficiencies are obtained with respect to a BD and DVD requiring accelerating in recording.

As described above, much of the quantity of the third light beam made incident to the second diffraction structure is distributed to the 1st order diffracted light and the −1st order diffracted light. The 1st order diffracted light converges on a position farther from the objective lens than the −1st order diffracted light because of having a longer focal length. This 1st order diffracted light is used in recording or reproduction to a CD, while the focal interval between the 1st order diffracted light and the −1st order diffracted light is longer than the working distance in recording or reproduction to a CD, so that the −1st order diffracted light is not falsely detected in a focus pull-in operation.

Also, the diffracting power in the paraxial position of the second diffraction structure HOE2 is negative, and accordingly, the third light beam made incident to the second diffraction structure HOE2 becomes a diverging ray and incident to the converging element. Therefore a sufficient working distance for a CD having a thick protective layer is ensured.

The spherical aberration of a spot formed on the information recording surface RL1 of the BD can be corrected by driving the negative lens EXP1 of the beam expander EXP in the optical axis direction by the uniaxial actuator UAC. A cause of generation of the spherical aberration corrected by position adjustment of the negative lens EXP1 includes, for example, variation of the wavelength owing to manufacturing error of the first light source LD1, the refractive index change and distribution of the objective lens system accompanying temperature change, focus jump between information recording surfaces of a multi-layer disk such as a dual-layer disk or a quadruple-layer disk, the thickness variation and distribution owing to manufacturing error of a protective layer of a next-generation DVD, and the like.

Even in case of the configuration of driving the first collimate lens COL1 in the optical axis direction instead of the negative lens EXP1, the spherical aberration of a spot formed on the information recording surface RL1 of the BD can be corrected.

The aberration correcting element L1 of the present embodiment is configured in such a way that the first diffraction structure HOE1 is formed on the optical function surface S1 on the light source side, and the second diffraction structure HOE2 is formed on the optical function surface S2 on the optical disk side, but to the contrary, the aberration correcting element L1 may be configured in such a way that the second diffraction structure HOE2 is formed on the optical function surface S1 on the light source side, and the first diffraction structure HOE1 is formed on the optical function surface S2 on the optical disk side.

Further, the DVD/CD laser light source unit LU in which the first emission point EP1 and the second emission point EP2 are formed on one chip, is used in the present embodiment. Without limitation thereto, however, a BD/DVD/CD laser light source unit may be used in which an emission point for emitting a laser beam of wavelength of 408 nm for BDs is further formed on the same chip. Alternatively, a BD/DVD/CD laser light source unit may be used in which three laser light sources of a blue-violet laser diode, red laser diode, and infrared laser diode are contained in one enclosure.

In the present embodiment, there is a configuration where a light source and a photo detector PD are separately arranged. Without limitation thereto, however, a laser light source module may be used in which a light source and a photo detector are integrated.

EXAMPLE

Next, an example of an objective lens suitable to be used for the above-described optical pickup device PU will be described.

Numeric data of the objective lens is shown in Table 1.

TABLE 1

| [Paraxial data] | | | | | | | | |
|---|---|---|---|---|---|---|---|---|
| Surface No. | r (mm) | d (mm) | $N_{BD}$ | $N_{DVD}$ | $N_{CD}$ | $N_d$ | $V_d$ | Remarks |
| OBJ | | ∞ | | | | | | emission point |
| STO | | 0.5000 | | | | | | stop |
| 1 | ∞ | 1.2000 | 1.524243 | 1.506434 | 1.504969 | 1.509142 | 56.5 | objective lens |
| 2 | ∞ | 0.2000 | | | | | | |
| 3 | 1.4492 | 2.6200 | 1.559645 | 1.540621 | 1.537237 | 1.543512 | 56.3 | |
| 4 | −2.8750 | d4 | | | | | | |
| 5 | ∞ | d5 | 1.621095 | 1.579750 | 1.573263 | 1.585463 | 30.0 | protective layer |
| 6 | ∞ | | | | | | | |

TABLE 1-continued

[Aspherical coefficient]

| | 3rd surface | 4th surface |
|---|---|---|
| K | −0.652486 | −43.575572 |
| A4 | 0.77549E−02 | 0.97256E−01 |
| A6 | 0.29588E−03 | −0.10617E+00 |
| A8 | 0.19226E−02 | 0.81812E−01 |
| A10 | −0.12294E−02 | −0.41190E−01 |
| A12 | 0.29138E−03 | 0.11458E−01 |
| A14 | 0.21569E−03 | −0.13277E−02 |
| A16 | −0.16850E−03 | 0.00000E+00 |
| A18 | 0.44948E−04 | 0.00000E+00 |
| A20 | −0.43471E−05 | 0.00000E+00 |

[Diffraction surface coefficient]

| | 1st surface | 2nd surface |
|---|---|---|
| $\text{dor}_{BD}/\text{dor}_{DVD}/\text{dor}_{CD}$ | 0/1/0 | 0/0/1 |
| λB | 658 nm | 785 nm |
| B2 | 0.36500E−02 | 0.35000E−01 |
| B4 | −0.10196E−02 | −0.20549E−02 |
| B6 | 0.16630E−04 | 0.17999E−02 |
| B8 | −0.93691E−04 | −0.42129E−03 |
| B10 | 0.90441E−05 | 0.77561E−04 |

$d4_{BD} = 0.7187$, $d4_{DVD} = 0.4851$, $d4_{CD} = 0.4757$, $d5_{BD} = 0.0875$, $d5_{DVD} = 0.6000$, $d5_{CD} = 1.2000$

In Table 1, r (mm) denotes a curvature radius and d (mm) denotes a lens interval. $N_{BD}$, $N_{DVD}$ and $N_{CD}$ denote refractive indices for a wavelength λ1 (=408 nm), a wavelength λ2 (=658 nm) and a wavelength λ3 (=785 nm), respectively, vd denotes an Abbe number of the lens at the d-line, and $\text{dor}_{BD}$, $\text{dor}_{DVD}$ and $\text{dor}_{CD}$ denotes a diffraction order of the diffracted light used for recording or reproduction to a BD, a diffraction order of the diffracted light used for recording or reproduction to a DVD and a diffraction order of the diffracted light used for recording or reproduction to a CD, respectively. A power-of-ten number (e.g. $2.5 \times 10^{-3}$) is expressed by using E (e.g. 2.5E−3).

The setting is: in using a BD, the numerical aperture of the objective lens NA1=0.85 and the diameter of the stop=3.74 mm; in using a DVD, the numerical aperture of the objective lens NA2=0.65 and the diameter of the stop=2.96 mm; in using a CD, the numerical aperture of the objective lens NA3=0.45 and the diameter of the stop=2.22 mm.

The objective lens of the present example is a BD/DVD/CD compatible lens, an aberration correction element is a plastic lens and a converging element is a plastic lens exclusively for a BD. Note that the converging element may be a glass lens.

The first diffraction structure HOE1 is formed on the optical surface (1st surface) on the light source side, and the second diffraction structure HOE2 is formed on the optical surface (2nd surface) on the optical disk side.

The first diffraction structure HOE1 and the second diffraction structure HOE2 are expressed by optical path differences added to a transmitted wavefront by these structures. The optical path differences are expressed by the optical path difference function φ (mm) that is made by substituting coefficients of Table 1 into the following formula (1):

$$\phi = \lambda/\lambda_B \times dor \times (B_2 y^2 + B_4 y^4 + B_6 y^6 + B_8 y^8 + B_{10} y^{10}) \quad (1)$$

where
φ: the optical path difference function
λ: a wavelength of a light beam incident to the diffraction structure
$\lambda_B$: a production wavelength dor: a diffraction order of the diffracted light used for recording or reproduction to an optical disk
y: a distance from the optical axis
$B_2$, $B_4$, $B_6$, $B_8$ and $B_{10}$: diffraction surface coefficients.

The first diffraction structure DOE1 corrects a spherical aberration caused by the difference between t1 and t2, and the second diffraction structure DOE2 corrects a spherical aberration caused by the difference between t1 and t3.

Figure 7:
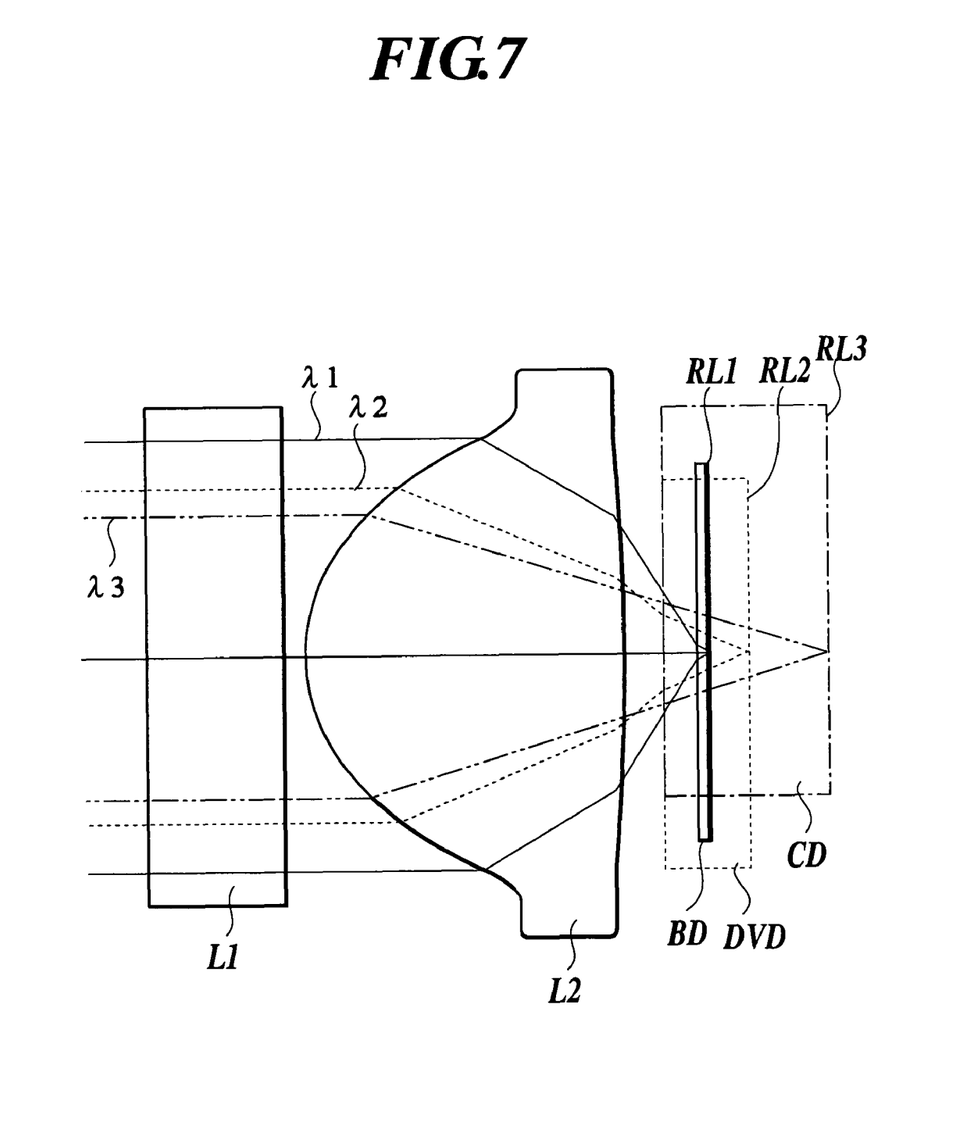
FIG. 7 is an optical path view.
Figure 8:
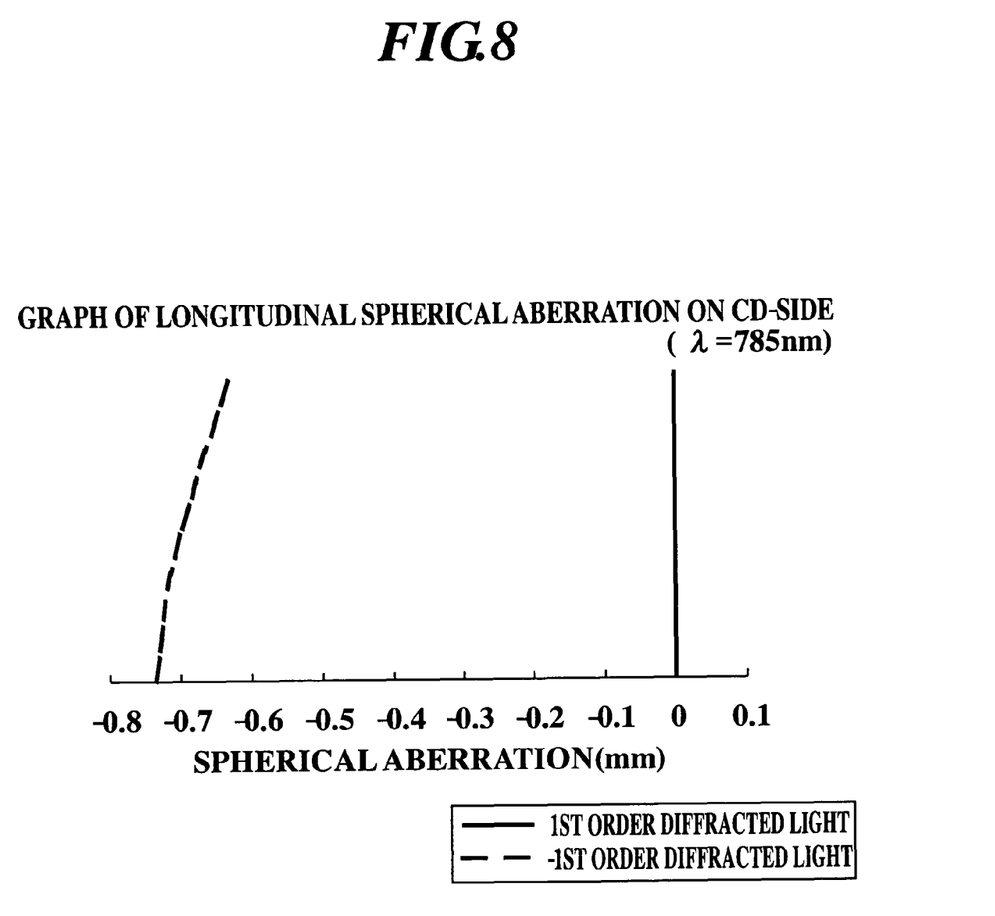
FIG. 8 is a graph showing a longitudinal spherical aberration on the CD-side.

The optical surface (3rd surface) on the light source side of the converging element and the optical surface (4th surface) on the optical disk side are aspherical forms. The aspherical surfaces are expressed by a formula that is made by substituting coefficients of Table 1 into the following formula (2):

$$z = (y^2/R)/[1 + \{1 - (K+1)(y/R)^2\}^{1/2}] + A_4 y^4 + A_6 y^6 + A_8 y^8 + A_{10} y^{10} + A_{12} y^{12} + A_{14} y^{14} + A_{16} y^{16} + A_{18} y^{18} + A_{20} y^{20} \quad (2)$$

where
z: an aspherical form (a distance from the surface vertex in the direction along the optical axis)
y: a distance from the optical axis
R: a curvature radius
K: a conic coefficient
$A_4$, $A_6$, $A_8$, $A_{10}$, $A_{12}$, $A_{14}$, $A_{16}$, $A_{18}$ and $A_{20}$: aspherical coefficients FIG. 7 is an optical path view and FIG. 8 is a graph of a longitudinal spherical aberration within an NA of 0.45 on the CD-side.

The distance between the focal positions of the 1st order diffracted light and −1st order diffracted light of a light beam of a wavelength λ3 for a CD is 0.6704 mm. The distance of the two focuses is longer than the working distance on the CD-side of 0.4757 mm. Note that the image point position having the minimum wavefront aberration is regarded as a focal position.

The entire disclosure of Japanese Patent Application No. Tokugan 2004-128629 filed on Apr. 23, 2004 including specification, claims, drawings and summary are incorporated herein by reference in its entirety.

What is claimed is:
1. An optical pickup device for performing recording and/or reproduction of information on a plurality of types of optical disks having different thicknesses of protective layer from one another by using light beams of a first wavelength λ1, a second wavelength λ2 and a third wavelength λ3 which are different from one another, the optical pickup device comprising:

a first light source for emitting the light beam of the first wavelength λ1;

a second light source for emitting the light beam of the second wavelength λ2;

a third light source for emitting the light beam of the third wavelength λ3, λ3 being longer than λ2 and λ2 being longer than λ1; and an objective lens comprising a diffraction structure, wherein when the light beam having the third wavelength λ3 is incident into the objective lens, diffracted lights of the third wavelength λ3 having various diffraction orders are generated, wherein the sum of diffraction efficiencies of two diffracted lights of the third wavelength λ3 having the two highest diffraction efficiencies in the diffracted lights is not less than 60%, wherein the objective lens performs recording or reproduction of information on an optical disk having a thickest protective layer of the plurality of types of optical disks by converging the diffracted light of the third wavelength λ3 having a longer focal length of the two diffracted lights onto an information recording surface through the thickest protective layer of the optical disk, and wherein a distance from the objective lens to a surface of the thickest protective layer along an optical axis is shorter than a distance between focuses of the two diffracted lights of the wavelength λ3 along the optical axis when the diffracted light having the longer focal length is converged onto the information recording surface of the optical disk through the thickest protective layer of the optical disk.

2. The optical pickup device of claim 1, wherein the diffraction structure does not diffract the light beam of the first wavelength λ1 and the light beam of the second wavelength λ2, but diffracts the light beam of the third wavelength λ3.

3. The optical pickup device of claim 2, wherein the diffraction structure is a multi-level type diffraction structure constituted of a plurality of ring surfaces having a step structure thereinside, and generates the two diffracted lights of a m-th order diffracted light and a −m-th order diffracted light.

4. The optical pickup device of claim 2, the diffraction structure is a multi-level type diffraction structure comprising a plurality of ring surfaces comprising a step structure, and generates the two diffracted lights of a m-th order diffracted light and a −m-th order diffracted light.

5. The optical pickup device of claim 3, wherein an optical path difference generated by a height of one step of the step structure is an integral multiple of the first wavelength λ1 and the second wavelength λ2 and a half-integral multiple of the third wavelength λ3.

6. The optical pickup device of claim 2, wherein a paraxial diffracting power is negative.

7. The optical pickup device of claim 2, wherein:

a spherical aberration of a wavefront formed by converging the diffracted light having the longer focal length through the protective layer is not more than 0.07 λrms, and a spherical aberration of a wavefront formed by converging the diffracted light having a shorter focal length through the protective layer is not less than 0.5 λrms, where λ is a wavelength of the incident light beam.

8. The optical pickup device of claim 1, where the light beams of the first wavelength λ1, the second wavelength λ2 and the third wavelength λ3 are incident to the objective lens as a parallel light beam.

9. An optical information recording or reproduction apparatus comprising an optical pickup device, wherein:

the optical pickup device performs recording and/or reproduction of information on a plurality of types of optical disks having different thicknesses of protective layer from one another by using light beams of a first wavelength λ1, a second wavelength λ2 and a third wavelength λ3 which are different from one another, and the optical pickup device comprises:

a first light source for emitting the light beam of the first wavelength λ1;

a second light source for emitting the light beam of the second wavelength λ2;

a third light source for emitting the light beam of the third wavelength λ3;

λ3 being longer than λ2, and λ2 being longer than λ1;

an objective lens, wherein the objective lens comprises a diffraction structure, wherein when the light beam having the third wavelength λ3 is incident into the objective lens, diffracted lights of the third wavelength λ3 having various diffraction orders are generated, wherein the sum of diffraction efficiencies of two diffracted lights of the third wavelength λ3 having the two highest diffraction efficiencies in the diffracted lights is not less than 60%, wherein the objective lens performs recording or reproduction of information on an optical disk having a thickest protective layer of the plurality of types of optical disks by converging the diffracted light of the third wavelength λ3 having a longer focal length of the two diffracted lights onto an information recording surface through the thickest protective layer of the optical disk, wherein a distance from the objective lens to a surface of the thickest protective layer along an optical axis is shorter than a distance between focuses of the two diffracted lights of the wavelength λ3 along the optical axis when the diffracted light having the longer focal length is converged onto the information recording surface of the optical disk through the thickest protective layer of the optical disk, and wherein the optical pickup device performs a focus pull-in operation by bringing the objective lens close to the optical disk.

* * * * *